Patented Mar. 21, 1950

2,501,145

UNITED STATES PATENT OFFICE 2,501,145

COMPOSITION FOR RELEASE OF OXYGEN

Nathan Smith, Jackson Heights, N. Y.

No Drawing. Application June 18, 1947,
Serial No. 755,483

7 Claims. (Cl. 167—93)

The invention relates to a composition of matter capable of releasing oxygen. More particularly, it pertains to a composition containing a perborate and includes correlated improvements and discoveries whereby the properties of such compositions are improved.

Heretofore, compositions have been prepared as pastes including a perborate but the vehicles used were either caustic, insoluble in an aqueous medium or contained compounds which reacted with the perborate thus resulting in unstable products. Those products decomposed within a short time following manufacture with loss of a substantial amount of the available oxygen.

An object of the invention is to provide a composition in the form of a cream or paste containing a perborate.

Another object of the invention is the provision of a composition containing a perborate which is stable for extended periods of time i. e., in which decomposition of the perborate with release of oxygen is substantially negligible.

A further object of the invention is to provide a composition which may be used for the generation of oxygen and more especially as an oxygen evolving toothpaste.

An additional object of the invention is the provision of a perborate containing composition which may be readily and economically produced to any desired extent.

A particular object of the invention is the provision of a composition which contains a water soluble alkali metal perborate, a polyethylene glycol having an average molecular weight of at least 300, and an aldehydic inactivating agent, either with or without a mild abrasive inorganic compound as a diluent.

Other objects of the invention will in part be obvious and will in part appear hereinafter.

The invention accordingly comprises a composition of matter possessing the characteristics, properties and the relation of constituents which will be exemplified in the composition hereinafter described and the scope of the invention will be indicated in the claims.

In the practice of the invention, a composition of matter is prepared in cream or paste form, which contains a perborate more particularly an alkali metal perborate and specifically a sodium perborate, which may be either a mono or a tetrahydrate. This compound may be present in an amount from about 10 to about 50 parts and desirably of about 15 to about 30 parts. Further, the perborate may be a sodium, potassium, magnesium or calcium perborate. Other constituents of the composition may be a polyethylene glycol having an average molecular weight of at least 300 and which may be as high as 2000, and an inactivating agent selected from the group consisting of benzaldehyde, oxyderivatives thereof and cinnamic aldehyde. As oxyderivatives of benzaldehyde mention may be made of vanillin, isovanillin, ethyl vanillin, o- and p-anisaldehyde and salicylic aldehyde.

Compositions that contain a perborate monohydrate, as sodium perborate monohydrate retain their stability in the presence of the polyethylene glycol even in the absence of the inactivating agent. The polyethylene glycol may be included in an amount from about 45 to about 85 parts and the inactivating agent from about 0.1 to about 0.5 part, preferably about 0.2 part. If desired, and it is usually advantageous, a diluent may be included, which is a solid inorganic compound having a mild abrasive action, e. g., calcium carbonate, magnesium carbonate, tricalcium phosphate and amorphous silica. The amount of these may be from 0 to about 50 parts, suitably about 35 parts. Moreover, the composition may contain a flavor in an amount from about 1 to about 2.5 parts suitably about 2 parts and this may be saccharin or an essential oil as wintergreen, peppermint, anise, clove and spearmint.

An acid reacting compound may be incorporated with utilization being made of monocalcium phosphate, and an acid reacting aluminum sulfate, e. g., aluminum sulfate and the sodium, potassium and ammonium aluminum sulfates. Inclusion of an acid reacting compound, as sodium aluminum sulfate, accomplishes neutralization of the alkali formed by decomposition of the perborate and hence leads to a substantially neutral aqueous solution.

As an illustrative embodiment of a manner in which the invention may be practiced, the following examples are presented. The parts are by weight.

Example 1

| | Parts |
|---|---|
| Sodium perborate tetrahydrate | 25 |
| Calcium carbonate | 35 |
| Polyethylene glycol (1500) | 6 |
| Polyethylene glycol (300) | 32 |
| Vanillin | 0.2 |
| Flavor | 1.8 |

Example 2

| | Parts |
|---|---|
| Sodium perborate tetrahydrate | 25 |
| Polyethylene glycol (1500) | 12 |
| Polyethylene glycol (300) | 61 |
| Vanillin | 0.2 |
| Flavor | 1.8 |

Example 3

| | Parts |
|---|---|
| Sodium perborate monohydrate | 18 |
| Calcium carbonate | 42 |
| Polyethylene glycol (1500) | 6 |
| Polyethylene glycol (300) | 32 |
| Vanillin | 0.2 |
| Flavor | 1.8 |

Example 4

| | Parts |
|---|---|
| Sodium perborate monohydrate | 18 |
| Polyethylene glycol (1500) | 14 |
| Polyethylene glycol (300) | 66 |
| Vanillin | 0.2 |
| Flavor | 1.8 |

Example 5

| | Parts |
|---|---|
| Sodium perborate monohydrate | 18.7 |
| Sodium aluminum sulfate | 11.6 |
| Polyethylene glycol (1500) | 6.0 |
| Polyethylene glycol (300) | 33.0 |
| Calcium carbonate | 29.0 |
| Vanillin | 0.2 |
| Flavor | 1.5 |

The compositions hereinbefore described yield a cream or paste which is stable with retention of available oxygen or oxidising power for a prolonged period of time. The vehicle or base, i. e., the polyethylene glycol should be viscous in order to provide a base suitable for use as a dentifrice, and the composition possesses the following properties; it dissolves readily in an aqueous medium, as saliva; it is non-irritating and non-toxic, and either of pleasant taste or tasteless. The vehicle should be compatible with the perborate, and it will be understood that the various constituents of the composition may be incorporated either individually or in compatible admixture.

As above indicated, the aldehydic compound, and more particularly a vanillin, when introduced in small percentages markedly increases the stability of the composition in cream or paste form thus rendering it suitable for placement and capable of being placed in collapsible metal tubes. Moreover, the composition containing a higher polyethylene glycol and a small amount of an aldehydic inactivating agent, as vanillin, does not undergo decomposition with loss of oxygen even though an acid reacting compound, as sodium aluminum sulfate, is included for the purpose of neutralizing the alkali liberated by the perborate when the composition is introduced into an aqueous medium. Although such a composition is much more active than sodium perborate alone nevertheless it does not decompose when prepared in the form of a paste until employed for the evolution of oxygen when brought into contact with an aqueous medium.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A composition of matter containing in cream form, a perborate, 10–50 parts, a polyethylene glycol having an average molecular weight of at least 300, 38–85 parts, and an inactivating agent selected from the group consisting of benzaldehyde, oxyderivatives thereof and cinnamic aldehyde in an amount from about 0.1 to about 0.5 part.

2. A composition of matter containing in cream form, a sodium perborate, 10–50 parts, a polyethylene glycol having an average molecular weight of at least 300, 38–85 parts, and an inactivating agent selected from the group consisting of benzaldehyde, oxyderivatives thereof and cinnamic aldehyde in an amount from about 0.1 to about 0.5 part.

3. A composition of matter containing in cream form, a perborate, 10–50 parts, a polyethylene glycol having an average molecular weight of at least 300, 38–85 parts, a diluent, and an inactivating agent selected from the group consisting of benzaldehyde, oxyderivatives thereof and cinnamic aldehyde in an amount from about 0.1 to about 0.5 part.

4. A composition of matter containing in cream form, a perborate, 10–50 parts, a polyethylene glycol having an average molecular weight of at least 300, 38–85 parts, an acid reacting compound, and an inactivating agent selected from the group consisting of benzaldehyde, oxyderivatives thereof and cinnamic aldehyde in an amount from about 0.1 to about 0.5 part.

5. A composition of matter containing in cream form, an alkali metal perborate, 10–50 parts, a polyethylene glycol having an average molecular weight of at least 300, 38–85 parts, and an inactivating agent selected from the group consisting of benzaldehyde, oxyderivatives thereof and cinnamic aldehyde 0.1–0.5 part.

6. A composition of matter containing in cream form, a sodium perborate, 10–50 parts, a polyethylene glycol having an average molecular weight of from about 300 to about 2000, 38–85 parts, and an inactivating agent selected from the group consisting of benzaldehyde, oxyderivatives thereof and cinnamic aldehyde in an amount from about 0.1 to about 0.5 part.

7. A composition of matter containing in cream form a sodium perborate, 10–50 parts, a polyethylene glycol having an average molecular weight of at least 300, 38–85 parts, and vanillin in an amount from about 0.1 to about 0.5 part.

NATHAN SMITH.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,172,743 | Taylor | Sept. 12, 1939 |
| 2,207,074 | Smith | July 9, 1940 |
| 2,236,828 | Muncie | Apr. 1, 1941 |
| 2,422,145 | Taylor | June 10, 1947 |

FOREIGN PATENTS

| Number | Country | Date |
|---|---|---|
| 36,202 | Netherlands | Aug. 15, 1935 |

OTHER REFERENCES

McClelland et al., "Technology of Polyethylene Glycols and Carbowax Compounds," Chem. and Eng. News, vol. 23, No. 3, Feb. 10, 1945, pages 247–251.

Reid, "Peroxide Ointments," Annals of Surgery, Oct. 1943, pages 741–750.

U. S. Dispensatory, 24th ed., 1947, pages 84 and 85.